Jan. 4, 1927.
E. WISS
DECORTICATING DEVICE
Filed Sept. 29, 1924
1,613,149
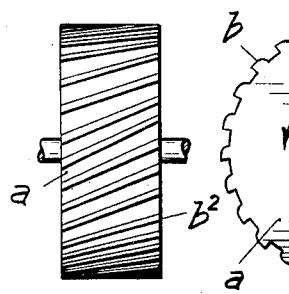
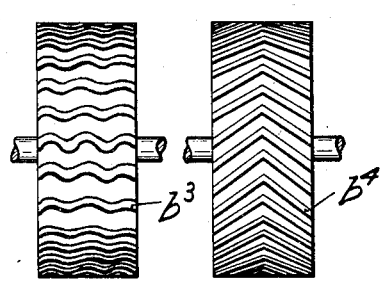
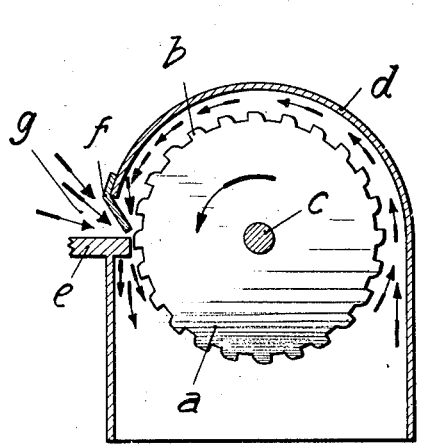
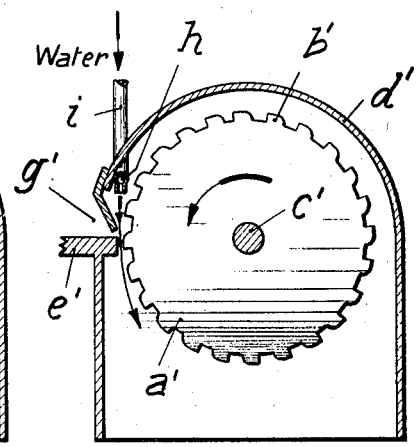
Inventor:
Ernst Wiss
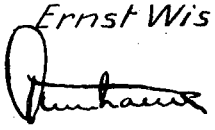
Atty.

Patented Jan. 4, 1927.

1,613,149

UNITED STATES PATENT OFFICE.

ERNST WISS, OF GRIESHEIM-ON-THE-MAIN, GERMANY, ASSIGNOR TO I. G. FARBENINDUSTRIE AKTIENGESELLSCHAFT, OF FRANKFORT-ON-THE-MAIN, GERMANY.

DECORTICATING DEVICE.

Application filed September 29, 1924, Serial No. 740,685, and in Germany October 12, 1923.

My invention relates to the treatment of fibrous plants and more particularly to a device for separating the fibrous portions of such plants.

Devices of this kind as hitherto used comprise a rotary beater cylinder having blades arranged on its circumference. The leaves fed into the machine are struck by blades which separate the cellular texture from the fibres.

A device of this type as hitherto designed will work satisfactorily only on leaves the cellular texture of which is thick and brittle, as is the case with agave leaves, while it fails with leaves in which the cellular texture resembles leather, such as the leaves of plants of the Yucca genus.

It is an object of my invention to improve these devices by utilizing the air which is circulated by the rapid rotation of the beater cylinder, for the separation of the fibres and the cellular texture of the vegetable material. To this end an air nozzle is formed in the hood of the machine through which air is drawn from outside into the hood by the air which is kept circulating therein by the rotating beater cylinder. Water or other liquid may be injected into this nozzle if it is desired to moisten the material during the separation of the fibres and the cellular texture, and this water will also be finely subdivided by the sucking action created at the nozzle and will contribute to separate the different parts of the leaves under treatment.

In the drawings affixed to the specification and forming part thereof two modifications of a device embodying my invention are illustrated diagrammatically by way of example.

In the drawings:

Fig. 1 is a side elevation and

Figs. 2, 3, and 4 are end elevations of beater cylinders adapted for use in a machine according to this invention, the cylinder in Fig. 2 having straight blades $b^2$ extending at an angle to the cylinder axis, while Figs. 3 and 4 show undulated blades $b^3$ and herringbone blades $b^4$ respectively.

Fig. 5 is a vertical section of one, and

Fig. 6 is a similar view of another modification.

Referring first to Fig. 5, the beater cylinder $a$, carrying the blades $b$ and mounted on a shaft $c$, is surrounded by a hood $d$. The material to be treated is fed along a table $e$ and acted upon by the blades $b$. The hood $d$ ends some distance above the table $e$ and a piece of sheet metal $f$ is mounted in the slot with its lower portion bent towards the beater cylinder, its lower edge being spaced from the table $e$ little more than the thickness of one of the thin leaves treated.

In the modification illustrated in Fig. 6, a spray tube $h$ supplied with water through a pipe $i$ is mounted in the hood above the piece $f$.

In both modifications the slot-like aperture left between the table $e$ (or $e'$) and the lower edge of the sheet metal piece $g$ (or $g'$) cooperates with the rapidly rotating beater cylinder to form a nozzle through which air is sucked into the hood just at the point where the material is fed into the machine so that the pulp caught by the blades is drawn in with the air, the remainder being withdrawn by hand. In machines where the material is fed in by hand, the nozzle also protects the hands of the operator.

The air nozzle also effects a very simple and efficient distribution of the liquid supplied by the liquid nozzle $h$ in Fig. 2. As shown in the drawing, the jets issuing from the tube $h$ in the direction of the arrow partly strike the edges of the air nozzle $g'$ and are thereby uniformly distributed.

The liquid is further atomized by the current of air generated by the rapidly rotating blades $b$, and the suction at the nozzle $g'$ draws all the liquid in between the blades and the edge of the table $e'$. By these means a very effective moistening and washing of the material is obtained, so that the separation is greatly facilitated and the material leaves the machine with a high degree of purity and practically without any vegetable coloring matter or parts of the cellular texture.

I wish it to be understood that I do not desire to be limited to the exact details of construction shown and described, for obvious modifications will occur to a person skilled in the art.

I claim:

1. A decorticating device for the treatment of thin leather-like leaves comprising a rotary beater cylinder, blades on this cylinder, a hood having a transverse slot, surrounding said cylinder and a feeding table extending into the transverse slot in said hood and in close proximity to the free edges of the blades on said cylinder and an inwardly extending member mounted on the upper edge of said slot, the distance between the lower edge of said member and the surface of said table being such that a suction nozzle is formed in which a strong suction effect is created by the blades moving past said slot.

2. A decorticating device for the treatment of thin leather-like leaves comprising a rotary beater cylinder, blades on this cylinder, a hood having a transverse slot surrounding said cylinder and a feeding table extending into the transverse slot in said hood and in close proximity to the free edges of the blades on said cylinder and an inwardly extending member mounted on the upper edge of said slot, the distance between the lower edge of said member and the surface of said table being such that a suction nozzle is formed in which a strong suction effect is created by the blades moving past said slot, and a spray tube inside said hood above the inner edge of said table.

In testimony whereof I affix my signature.

ERNST WISS.